(No Model.)
T. SMALL & A. ENTWISTLE.
HANGER FOR PICTURES, &c.
No. 511,655.
Patented Dec. 26, 1893.
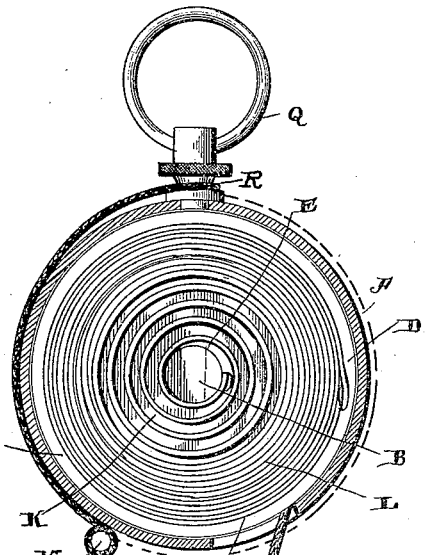
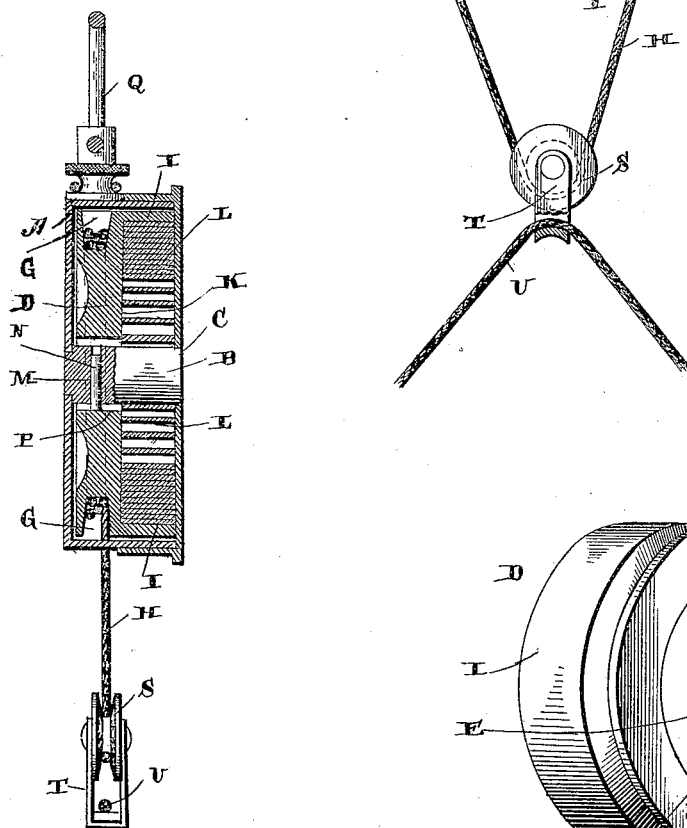
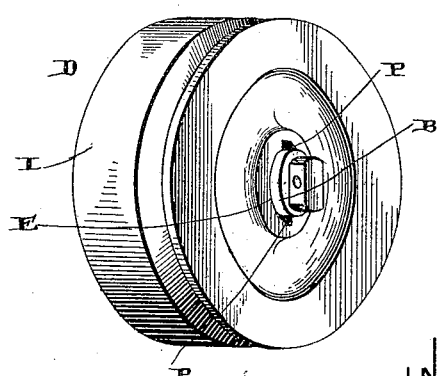
Witnesses
Geo. E. Frech
Roland A. Fitzgerald
Inventors
Thomas Small
Alfred Entwistle
per Lehmann Pattison Nesbit attys
THE NATIONAL LITHOGRAPHING COMPANY,
WASHINGTON, D. C.

UNITED STATES PATENT OFFICE.

THOMAS SMALL AND ALFRED ENTWISTLE, OF GLOUCESTER CITY, NEW JERSEY.

HANGER FOR PICTURES, &c.

SPECIFICATION forming part of Letters Patent No. 511,655, dated December 26, 1893.

Application filed November 16, 1892. Serial No. 452,190. (No model.)

*To all whom it may concern:*

Be it known that we, THOMAS SMALL and ALFRED ENTWISTLE, of Gloucester City, in the county of Camden and State of New Jersey, have invented certain new and useful Improvements in Hangers for Pictures, Lamps, Bird-Cages, &c.; and we do hereby declare the following to be a full, clear, and exact description of the invention, such as will enable others skilled in the art to which it pertains to make and use it, reference being had to the accompanying drawings, which form part of this specification.

Our invention relates to improvements in hangers for pictures, lamps, bird-cages and other similar objects, and it consists in the particular construction which will be fully described hereinafter and particularly referred to in the claim.

The object of our invention is to provide a hanger for pictures, lamps, bird-cages and other objects which are suspended from the wall or ceiling, and to so construct the said hanger as hereinafter specified, whereby the object suspended can be lowered without removing it from the hook for the purpose of cleaning, or for any other purpose, and then returned to any desired height where it will remain.

In the accompanying drawings:—Figure 1 is a side elevation of our invention, partly in section. Fig. 2 is a vertical central transverse sectional view of the same. Fig. 3 is a detached perspective view of the spring contained pulley, the spring being shown in place therein.

A indicates a casing made preferably of thin metal such as tin or brass, and which is made of a suitable size, for the purpose for which it is intended. Supported at its ends concentrically in the side walls of this casing is a central shaft or spindle B, which is provided with a rounded portion C, at one end, fitting in a correspondingly shaped opening in one wall of the said casing, and the opposite end of this spindle or bearing is made flat or oval as shown and extends into a correspondingly shaped opening in the opposite side of the said casing. A pulley or sheave D is placed within this casing and is provided with an opening E which fits the rounded portion of the said spindle, and upon this the pulley revolves as will fully appear farther on. This pulley as clearly shown in Fig. 2 is provided with a peripheral groove G, in which a cord, wire or chain H, is wound, and with a laterally extending annular flange I, which forms a spring cavity or chamber K. Placed within this cavity or chamber is a coiled spring L, which has one end secured to the spindle in any suitable manner, and its opposite and outer end secured to the inner face of the flange forming the wall of the spring cavity as clearly illustrated. In this manner the said pulley is revolved by the spring in a manner similar to the shaft of the spring drum of a watch, as will be readily understood. In order to lock the pulley at any desired point upon the said spindle, and thereby regulate the tension of the spring, or to prevent the pulley from being revolved by the said spring, the spindle is provided at its rounded portion with a transverse opening M, in which is placed a sliding locking pin N. Made in the wall of the central opening of the pulley are one or more substantially ratchet-shaped recesses P, into which the end or ends of the pin will drop when the said recess registers with the pin. It will be noticed that this pin stands in a vertical position, or substantially vertical position, so that it will drop of its own gravity into any one of the recesses when they register with the said pin, thus locking the said pulley against rotation under the tension of the spring.

Connected with the upper end of the casing is a ring Q, which is intended to be caught over a nail or hook. The cord or wire passes a suitable number of times around the pulley, and has its outer end attached to the casing, preferably at the point R, which is at the said ring. A wheel S is provided with a deep groove and in this the cord passes, and journaled upon the wheel is a loop T, through which the picture frame cord U passes, as illustrated in Fig. 1. Extending outward from the said casing is a pin V, around which the cord at this point is wrapped after passing around the casing. When it is desired to make the spring strong, the cord is wrapped around the casing the desired number of times as shown in dotted lines in Fig. 1, and then wrapped or caught around this pin.

The object of making one end of the spindle flat as described, is to prevent it from revolving when the cord is being drawn upon, and the pulley thus being turned against the tension of the spring. When it is desired to lower the picture it is only necessary to pull down upon the frame, and when it is desired to have it go up, it is only necessary to pull down upon the picture and then suddenly let it go up, which will prevent the pin from catching in the recess, and the spring will then revolve the pulley in the direction to wrap thereon the cord.

The opening in the spindle for the locking pin passes entirely through the spindle, and this enables the position of the device to be reversed should it be desired, and the operation of the device be the same so far as the locking is concerned.

By means of the above described construction we have produced a very simple device whereby the pulley is locked at any desired point, and whereby the spring is contained wholly within the pulley.

Having thus described our invention, what we claim, and desire to secure by Letters Patent, is—

A hanger for the purpose described comprising a casing, a spring actuated pulley therein, a lock therefor, a suspending device at the upper side of the casing, a cord passing around the pulley through the casing and having its opposite end connected with the outer side of the casing, and a pin connected to the casing between the connecting point and the point where the cord passes into the casing, and around which the cord is wound for the purpose described.

In testimony whereof we affix our signatures in presence of two witnesses.

THOS. SMALL.
ALFRED ENTWISTLE.

Witnesses:
RICHARD J. HOFFNER, Jr.,
GEO. G. CUBBLER.